United States Patent [19]
Cook et al.

[11] Patent Number: 5,279,446
[45] Date of Patent: Jan. 18, 1994

[54] BEVERAGE COOLING SYSTEM

[75] Inventors: Christopher M. Cook, Greenlands; Andrew Rigby, Plympton, both of England

[73] Assignee: The Cornelius Company, Anoka, Minn.

[21] Appl. No.: 12,607

[22] Filed: Feb. 2, 1993

Related U.S. Application Data

[63] Continuation of Ser. No. 641,022, Jan. 11, 1991, abandoned.

[51] Int. Cl.⁵ ............................. B67D 5/08; B67D 5/14
[52] U.S. Cl. ....................................... 222/54; 222/63; 222/146.6; 222/318
[58] Field of Search ............. 222/54, 63, 129.1, 146.6, 222/318

[56] References Cited

U.S. PATENT DOCUMENTS

| | | |
|---|---|---|
| 3,006,507 | 10/1961 | Baverlein ............................... 222/54 |
| 3,310,203 | 3/1967 | McCann .................................. 222/54 |
| 4,478,355 | 10/1984 | Houman ................................. 222/54 |

FOREIGN PATENT DOCUMENTS

| | | |
|---|---|---|
| 2015966 | 9/1976 | United Kingdom .................. 222/54 |
| 1494744 | 12/1977 | United Kingdom .................. 222/54 |
| 2176026 | 12/1986 | United Kingdom .................. 222/54 |

Primary Examiner—Andres Kashnikow
Assistant Examiner—Kenneth DeRosa
Attorney, Agent, or Firm—Sten E. Hakanson

[57] ABSTRACT

A beverage dispensing system incorporates an insulated python for delivering a plurality of beverages from sources thereof to remotely located dispensing valves. A coolant line extends through the python for cooling the beverages. A pump provides for pumping of a coolant through the coolant line from a refrigerated source thereof, through the python and back to the refrigerated source. A temperature sensor senses the temperature of the circulating coolant for regulating the operation of the pump in accordance with the sensed temperature.

14 Claims, 1 Drawing Sheet

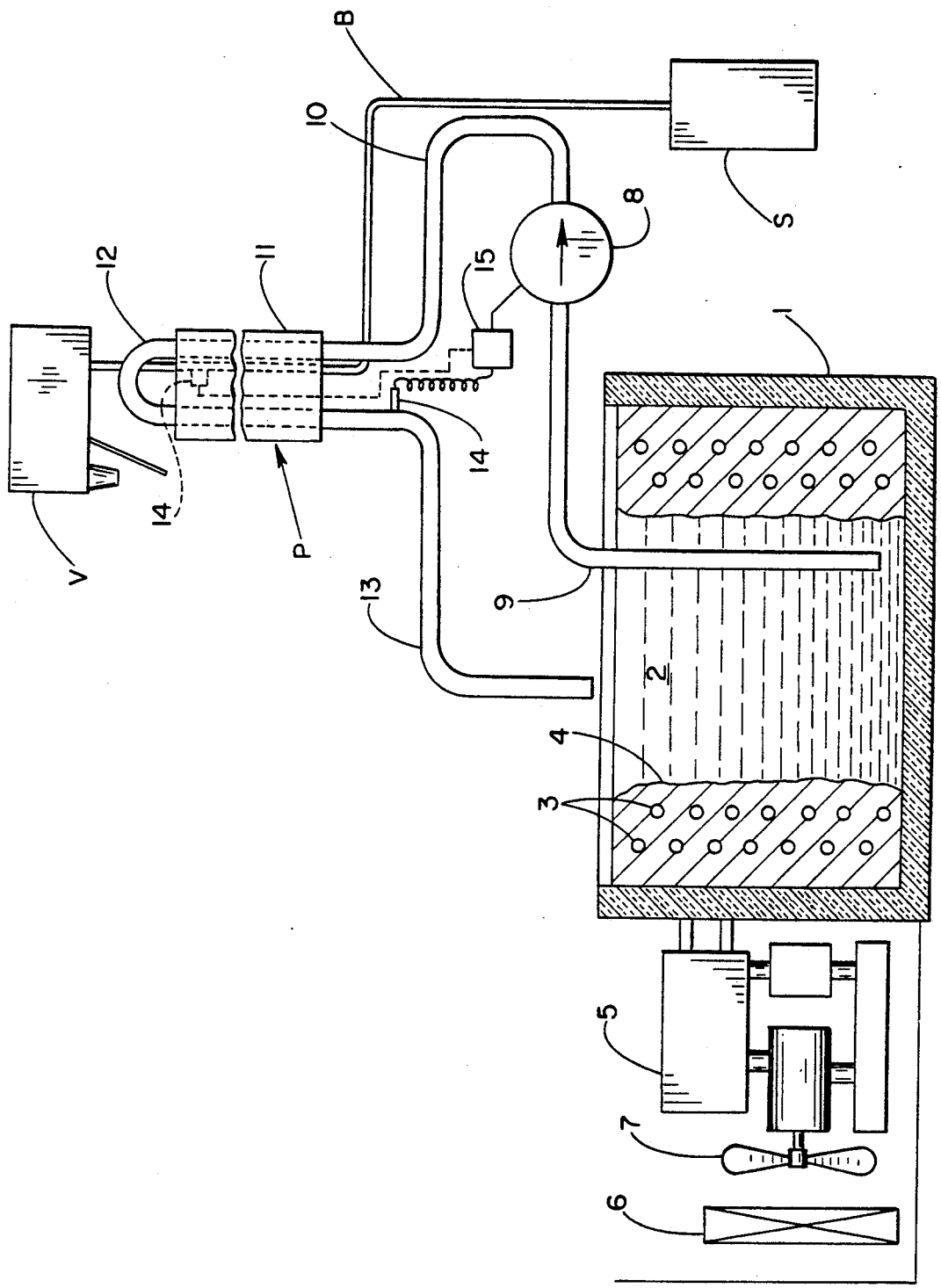

BEVERAGE COOLING SYSTEM

This is a continuation of application Ser. No. 07/641,022 filed on Jan. 11th, 1991, abandoned as of the date of this application.

BACKGROUND OF THE INVENTION

1. Field of the Invention

This invention relates to beverage cooling systems and has particular reference to beverage cooling systems used in connection with so-called python systems.

2. Background

A python comprises a large diameter (10 cm) insulated plastics tube containing a plurality of beverage lines which are used to interconnect a series of beverage storage containers with a series of beverage dispense points. The python prevents the beverages, or beverage components such as beer, carbonated water and syrup, from being over-heated in their passage from a temperature stabilized cellar to the beverage dispense point. Typically, in a bar or restaurant, the beverage dispense lines pass through the bar area which area can be very warm relative to the desired dispensing temperature of the beverage. Where the beverage is dispensed intermittently, and in the absence of an insulated python, the beverage would become over-warm in the beverage lines.

Normally, the small diameter beverage lines are placed concentrically around a central, larger diameter, pipe through which cold water is pumped to maintain the product temperature. This water is re-circulated via a chiller.

In order that the re-circulation system can provide the initial lift for the water, a large pump is necessary to pump the water through the larger pipe and back to the water chiller. However, once the initial lift of water has been provided, a quantity of chilled water far in excess of the system's usual requirements continues to be pumped around the system.

Normally, the chilled water is obtained from a water bath containing an ice bank, the ice bank having been formed on an evaporator of a refrigeration system. The ice bank builds up during periods of low demand and is used to even out the refrigeration load requirement.

Unfortunately, with high water flow rates, the excess of water slowly eliminates the ice bank, thus reducing the efficiency of the cooler unit. Furthermore, the high flow rate of chilled water can over-chill the drinks in the python and the initial drinks served after the python has been standing for some while can be at too low a temperature.

SUMMARY OF THE INVENTION

By the present invention, there is provided a beverage cooling system including a water bath, a refrigerator evaporator in the water bath, an insulating tube containing a plurality of beverage lines, and a re-circulating coolant line, a pump for pumping water from the water bath through the re-circulating coolant line and back into the water bath, characterized in that there is provided means to vary the output (i.e., the volumetric flow rate) of the pump so as to have at least two output volumes.

The output of the pump may be varied manually such that the output is reduced after the original lift of water has occurred. Alternatively, the output may be varied automatically such that after the initial lift has been achieved, a timer operates to reduce the pump speed to a lower level.

In a further alternative, the pump output may be varied in response to variations of temperature of the interior of the insulating tube, or of the water returning from the insulating tube or reaching the distal end of the insulating tube, or of the temperature of the beverage passing through the beverage lines, preferably at or near the outlet of the beverage lines.

The output of the pump may be increased with an increase in sensed temperature.

The pump output may be varied by varying its speed. The pump is preferably driven by an electric motor, and the motor speed may be variable continuously or in discrete steps. The motor may be controlled by phase angle control. The pump may be a regenerative pump or a centrifugal pump. The output of the centrifugal pump may be varied by throttling the cooling in flow.

BRIEF DESCRIPTION OF THE DRAWING

By way of example, embodiments of the present invention will now be described with reference to the accompanying drawing, wherein:

FIG. 1 shows a schematic view of a beverage cooling system in accordance with the present invention.

DETAILED DESCRIPTION OF THE PREFERRED EMBODIMENT

In the drawing, there is shown an insulated container 1 forming a water reservoir 2 for cooling water. An evaporator coil 3 forms an ice bank 4 in the water reservoir. A refrigeration system of conventional form including a compressor pump 5 to compress refrigerant, a condenser 6 and a fan 7 acts in the normal manner to provide a flow of refrigerant to the evaporator coil 3. The thickness of the ice bank 4 can be controlled by any suitable means.

The pump 8 draws water from the water reservoir 2 via a dip tube 9 and passes it to an outlet pipe 10 that extends through an insulating tube 11, which insulates a portion of a python system P. Python system P is formed of a plurality of beverage lines passing through insulating tube 11 in close heat exchange contact with a portion of coolant line 10. A representative beverage line B is shown and provides for fluid communication of a beverage from a source S thereof to a dispensing valve V. Coolant line 10 is of conventional form wherein the chilled water is re-circulated through loop 12 and back via outlet end 13 thereof into the water reservoir 2. A temperature sensor 14 senses the return temperature of water emerging from the python system and controls the speed of pump 8 via control box 15. The sensor 14, as indicated in phantom outline, may also be located on a beverage line under insulation tube 11.

When the system is switched on initially, the water in outlet end portion 13 will be warm. This will be sensed by sensor 14 and the control box 15 will operate pump 8 at its maximum speed. As the water circulating through line 10 chills the beverage in line B, the return water temperature falls and this is sensed by sensor 14.

With the fall in the temperature, control box 15 reduces the speed of pump 8. This reduction causes a reduction in the power requirement of the system, a reduction in the noise of the system, a reduction in the excessive water flow over the ice bank 4 and also reduces the wear on pump 8 and its drive motor.

Controlling the speed of pump 8 thus has a number of significant advantages compared to existing systems.

The noise levels are lower, the wear on the pump is lower, and the power requirement for the pump is reduced, hence the electrical costs are lower. There is also a hidden benefit in that the refrigeration costs are lowered. By reducing over cooling, the amount of chilled water required for re-circulation is lowered, and hence the refrigeration load is lowered. There is thus a double power saving.

The pump 8 may be a centrifugal pump, but is preferably a regenerative pump. It is preferably driven by an electric motor—typically a ¼ horsepower AC induction motor rated 180 W. Control may be by phase angle control or by chopping the wave form. An electronic control circuit can be used to chop the form of the AC wave for power control purposes. If a centrifugal pump is used, the power output can be controlled by throttling the coolant inflow, which will reduce output and electric motor load.

It will be appreciated by those of skill in the art that various sources of cold water can be used other than through the provision of a water bath 2, as described herein. It can also be understood that the water does not necessarily need to be recycled. In addition, various liquid or otherwise fluid coolants could be used other than water.

What is claimed is:

1. A beverage cooling and dispensing system, comprising:
   a source of liquid coolant;
   a source of beverage;
   a coolant line having an inlet end connected to said coolant source, an outlet end, and an intermediate portion;
   a beverage line having an inlet end connected to said beverage source, an outlet end connected to a dispensing valve, and an intermediate portion;
   said beverage line portion being in close heat exchange contact with said coolant line portion to form a heat exchange portion;
   pump means for pumping coolant from said coolant source through said coolant line to said coolant line outlet end, said pump means having a first output whereby coolant is pumped through the coolant line at a high flow rate to effect a high heat transfer rate between said coolant line and said beverage line at the heat exchange portion and a second output whereby coolant is pumped through the coolant line at a lower flow rate to effect a lower heat transfer rate between said coolant line and said beverage line at the heat exchange portion, said first and second outputs being greater than zero;
   a temperature sensing means for sensing a temperature of one of the beverage or the coolant downstream of the heat exchange portion; and
   control means for operating said pump means at said first output when said temperature sensing means senses a temperature that is higher than a predetermined temperature and for operating said pump means at said second output when said temperature sensing means senses a temperature that is lower than said predetermined temperature.

2. The beverage cooling and dispensing system of claim 1, wherein the control means initially operates said pump means at said first output and after a predetermined interval operates said pump means at said second output.

3. The beverage cooling and dispensing system of claim 1, wherein the liquid coolant is water.

4. The beverage cooling and dispensing system of claim 3, wherein said coolant source is a refrigerated water bath and wherein said coolant line outlet end communicates with said water bath for returning water to said water bath to provide recirculation of the water through said coolant line.

5. The beverage cooling and dispensing system of claim 1, further including insulation disposed around said coolant line and said beverage line substantially along the heat exchange portion.

6. A beverage cooling and dispensing system, comprising:
   a refrigerated water bath;
   a source of beverage;
   a water line having an inlet end connected to said bath, an outlet end, and an intermediate portion;
   a beverage line having an inlet end connected to said beverage source, an outlet end connected to a dispensing valve, and an intermediate portion;
   said beverage line portion being in close heat exchange contact with said water line portion to form a heat exchange portion;
   pump means for pumping water from said bath through said water line through said water line outlet end and back to said bath, said pump means having a first output whereby water is pumped through the water line at a high flow rate to effect a high heat transfer rate between said water line and said beverage line at the heat exchange portion and a second output whereby water is pumped through the water line at a lower flow rate to effect a lower heat transfer rate between said water line and said beverage line at the heat exchange portion, said first and second outputs being greater than zero;
   a temperature sensing means for sensing a temperature of one of the beverage or the water at a point along the heat exchange portion; and
   control means for operating said pump means at said first output when said temperature sensing means senses a temperature that is higher than a predetermined temperature and for operating said pump means at said second output when said temperature sensing means senses a temperature that is lower than said predetermined temperature.

7. The beverage cooling and dispensing system of claim 6 wherein the temperature sensing means senses the temperature of the water at a downstream end of the heat exchange portion.

8. The beverage cooling and dispensing system of claim 6 wherein the temperature sensing means senses the temperature of the beverage in the beverage line.

9. The beverage cooling and dispensing system of claim 6, wherein the control means initially operates said pump means at said first output and after a predetermined interval operates said pump means at said second output.

10. The beverage cooling and dispensing system of claim 6, further including insulation disposed around said water line and said beverage line substantially along the heat exchange portion.

11. A beverage cooling and dispensing system, comprising:
    a refrigerated water bath;
    a source of beverage;
    a water line having an inlet end connected to said bath, an outlet end, and an intermediate portion;

an insulating tube containing a plurality of beverage lines each having an inlet end connected to said beverage source, an outlet end connected to a dispensing valve, and an intermediate portion;

said beverage line portions being in close heat exchange contact with said water line portion to form a heat exchange portion;

pump means for pumping water from said bath through said water line through said water line outlet end and back to said bath, said pump means having a first output whereby water is pumped through the water line at a high flow rate to effect a high heat transfer rate between said water line and said beverage lines at the heat exchange portion and a second output whereby water is pumped through the water line at a lower flow rate to effect a lower heat transfer rate between said water line and said beverage lines at the heat exchange portion, said first and second outputs being greater than zero;

a temperature sensing means for sensing a temperature of one of the beverage or the water at a point along the heat exchange portion; and control means for operating said pump means at said first output when said temperature sensing means senses a temperature that is higher than a predetermined temperature and for operating said pump means at said second output when said temperature sensing means senses a temperature that is lower than said predetermined temperature.

12. The beverage cooling and dispensing system of claim 11 wherein the temperature sensor senses the temperature of the water returning in the water line to the bath.

13. The beverage cooling and dispensing system of claim 11 wherein the temperature sensor senses the temperature of the water reaching the water line outlet end.

14. The beverage cooling and dispensing system of claim 11, wherein the control means initially operates said pump means at said first output and after a predetermined interval operates said pump means at said second output.

* * * * *